(12) United States Patent
Keenan et al.

(10) Patent No.: US 10,821,661 B2
(45) Date of Patent: Nov. 3, 2020

(54) TACK AND BOND ADHESIVE SYSTEM AND METHOD FOR LAYERED OBJECT MANUFACTURE

(71) Applicant: MCOR Technologies Limited, Dunleer, Co. Louth (IE)

(72) Inventors: Philip Keenan, Baldock (GB); Fintan MacCormack, Ardee (IE); Conor MacCormack, Ardee (IE)

(73) Assignee: MCOR TECHNOLOGIES LIMITED, Dunleer (IE)

( * ) Notice: Subject to any disclaimer, the term of this patent is extended or adjusted under 35 U.S.C. 154(b) by 0 days.

(21) Appl. No.: 16/156,462

(22) Filed: Oct. 10, 2018

(65) Prior Publication Data

US 2019/0039364 A1 Feb. 7, 2019

Related U.S. Application Data (62) Division of application No. 14/770,777, filed as application No. PCT/EP2014/053859 on Feb. 27, 2014, now abandoned.

(30) Foreign Application Priority Data

Feb. 27, 2013 (GB) .................................. 1303468.1

(51) Int. Cl.
*B29C 64/147* (2017.01)
*B32B 37/04* (2006.01)
(Continued)

(52) U.S. Cl.
CPC ............ *B29C 64/147* (2017.08); *B32B 37/04* (2013.01); *B32B 2255/00* (2013.01); *B33Y 10/00* (2014.12); *B33Y 30/00* (2014.12)

(58) Field of Classification Search
CPC ..... B29C 64/10; B29C 64/141; B29C 64/147; B29C 64/153; B29C 64/188; B33Y 10/00;
(Continued)

(56) References Cited

U.S. PATENT DOCUMENTS 6,056,843 A * 5/2000 Morita ................ B32B 37/1292
156/250
2002/0111707 A1 8/2002 Li
(Continued)

FOREIGN PATENT DOCUMENTS

DE 102009039578 A1 3/2011
EP 0633129 A1 1/1995
(Continued)

OTHER PUBLICATIONS

Patent Cooperation Treaty: International Search Report and Written Opinion for PCT/EP2014/053859 dated Oct. 31, 2014; 17 pages.

*Primary Examiner* — John L Goff, II
(74) *Attorney, Agent, or Firm* — Schwabe Williamson & Wyatt, PC (57) ABSTRACT

Provided is an adhesive dispensing device for use in a Layered Object Manufacturing (LOM) system for forming a three-dimensional (3D) object, the device configured to apply adhesive to a plurality of object media layers each comprising a temporary region and a permanent region. A first adhesive is applied to the temporary regions and a second adhesive is applied to the permanent regions. Further provided are first and second adhesive formulations, a bonding module for bonding a plurality of individual object media layers using the first and second adhesives, and a LOM system comprising the bonding module. Also provided is a method for self-weeding of a LOM object.

6 Claims, 7 Drawing Sheets

(51) Int. Cl.
   *B33Y 10/00*    (2015.01)
   *B33Y 30/00*    (2015.01)

(58) Field of Classification Search
   CPC ......... B33Y 30/00; B32B 37/04; B32B 37/06;
                B32B 38/10; B32B 38/105; Y10T
                156/1153
   USPC ................................................ 156/247, 711
   See application file for complete search history.

(56) References Cited

U.S. PATENT DOCUMENTS

| | | |
|---|---|---|
| 2002/0167101 A1 | 11/2002 | Tochimoto |
| 2003/0234851 A1 | 12/2003 | Booth |
| 2009/0261067 A1 | 10/2009 | Dietrich |
| 2016/0009062 A1 | 1/2016 | Keenan |
| 2017/0181259 A1 | 8/2017 | Bar-Erez |

FOREIGN PATENT DOCUMENTS

| | | |
|---|---|---|
| GB | 2455124 A | 6/2009 |
| WO | 2014/131848 A2 | 9/2014 |

* cited by examiner

TACK AND BOND ADHESIVE SYSTEM AND METHOD FOR LAYERED OBJECT MANUFACTURE

CROSS-REFERENCE TO RELATED APPLICATIONS

This application is a divisional of U.S. application Ser. No. 14/770,777, filed Aug. 26, 2015, now abandoned, which is a national phase entry under 35 USC § 371 of International Application No. PCT/EP2014/053859, filed Feb. 27, 2014, which designates the United States of America, which claims priority to UK Application No. 1303468.1, filed Feb. 27, 2013, the entire disclosures of which are hereby incorporated by reference and for all purposes.

FIELD

The present application relates to Laminated or Layer Object Manufacturing (LOM), and in particular to devices and in particular a tack and bond adhesive system and method for Layered Object Manufacture.

BACKGROUND OF THE INVENTION

Rapid prototyping is defined as computer-controlled additive fabrication, in that an object can be fabricated by the addition of material rather than conventional machining methods that rely on removal or the subtraction of material. The term "rapid" is, it will be appreciated, a relative term but one that has specific meaning within the art, in that construction of a finished three dimensional articles can take from several hours to several days, depending on the method used and the size and complexity of the model. There are many known methodologies that are employed within the general field of rapid prototyping Layered Object Manufacture (LOM) is one form of Rapid prototyping (RP) which relates to the successive layering of adhesive-coated paper, plastic, or metal laminates which are then successively glued together and cut to shape with a knife or laser cutter.

After a plurality of media object layers are formed, a profiling and layer bonding process is performed. The plurality of layers are bonded together, and then a profiling or weeding process is performed which comprises removing unwanted support material from the printed media stack to reveal the 3D printed object.

Figure 1:
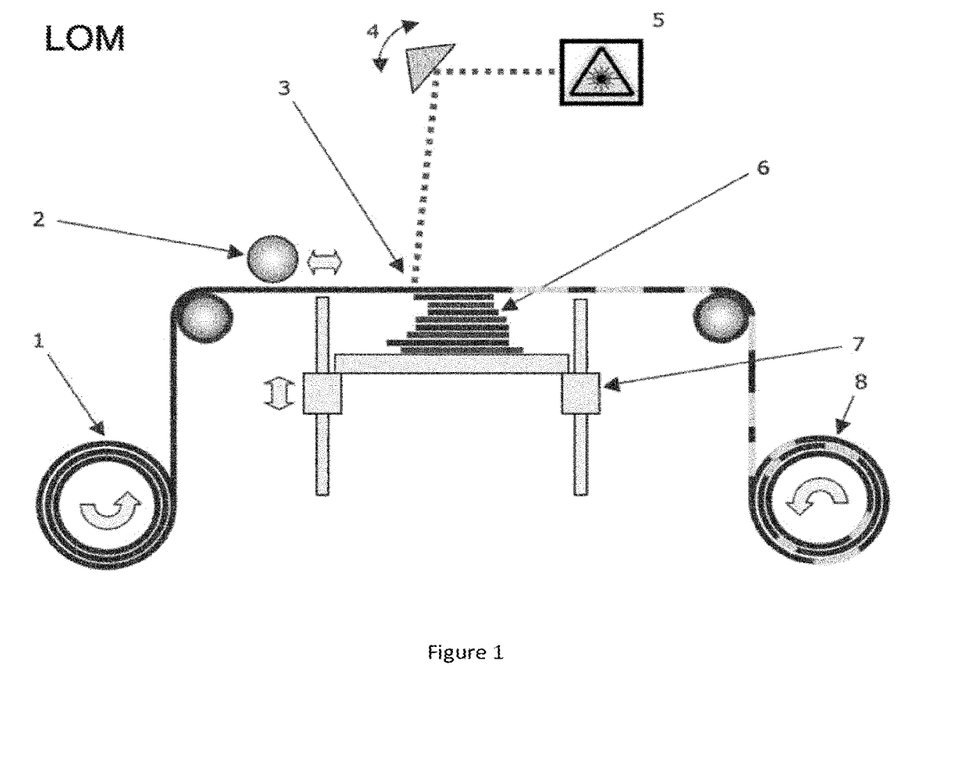
FIG. 1 is a diagram illustrating a conventional LOM assembly process in which adhesive is pre-applied to the media on a roll, wherein the adhesive is activated by a heated roller to cause layers in contact to bond together.

In LOM rapid prototyping, there are initially two regions of the LOM object. That is, the LOM object comprises permanent regions where the layers are bonded together to constitute the final 3D object, and a temporary regions subsequently "weeded" to separate and remove them from the final 3D object. In typical LOM manufacturing, adhesive is pre-applied to the media on a roll. FIG. 1 is a diagram illustrating a conventional LOM assembly process in which adhesive is pre-applied to the media on a roll 1. The adhesive is activated by a heated roller 2 to cause layers 6 in contact to bond together. A laser unit 5 irradiating a laser beam 3 via a prism 4 facilitates removal of waste material.

In existing LOM systems that employ paper based raw materials, the paper is provided in the form of a roll. The roll of paper may be provided with adhesive already present on the underside. In this case, the adhesive may be activated by heat and/or pressure to form a bond onto the previous layer. In an alternative approach, adhesive may be applied to the underside of the material as it is drawn from a roll. However, there are a number of disadvantages associated with the use of roll material. For example, a machine is often operable only with specifically manufactured rolls of material, which may be expensive to obtain and/or difficult to replace. There are also disadvantages associated with the day to day use of rolls of raw material. For example, the rolls may become stuck or jammed in the feeding mechanism due to the pre-applied adhesive thereon. With the above, removal of the waste material can be very difficult because it is adhered together with the same adhesive force as the part being made. This can lead to the part being damaged during waste removal "weeding", as chisels and other sharp implements are often needed to prise the object free.

In US 2011/0094441 A1 adhesive is applied to the media by using a wheel with dimples filled with adhesive which is then brought in contact with the substrate to transfer controlled amounts of adhesive at discrete points on the substrate. This system is able to digitally apply a higher glue dot printing density in the permanent bonded regions of the LOM assembly, and a lower density of dots in the temporary support regions.

Other methods of applying adhesive between paper layers include: coating the entire working area of the sheet, which as noted above produces significant difficulties when removing waste material during post processing the finished part; and using a substance which when placed in certain locations on the sheet prevents adhesion at these locations. This technique has the disadvantage of effectively wasting adhesive by initially coating the entire sheet.

It is further noted that current LOM systems often use adhesives that are solvent based and which are not water soluble and thus present environmental issues for example, for the purposes of disposal. However, such solvent based adhesive have to date been used in LOM as the use of water-based adhesives having a high wet content presents further problems such as warping and distortion of the paper which has prejudiced their application in LOM systems.

Thus, there are a number of problems associated bonding and with removal of waste material in LOM systems for rapid prototyping that need to be addressed.

SUMMARY

According to an aspect there is provided a method of bonding a plurality of individual object media layers to form a three-dimensional (3D) object in a Layered Object Manufacturing (LOM) system, each object media layer comprising temporary regions and permanent regions, the method comprising:
  applying a first tack adhesive to the temporary regions of each of a plurality of object media layers;
  applying a second bond adhesive to the permanent regions of each of the plurality of object media layers;
  positioning the object media layers on top of each other to form an LOM object;
  heating the object media layers above a predetermined temperature causing the first tack adhesive to melt, and on cooling re-solidify to form temporary bond regions;
  heating the object media layers above the melting point of the first tack adhesive, causing the first tack adhesive to migrate away from the temporary bond regions by capillary action; and
  separating the temporary regions from the LOM object.

The method may include heating the object media layers above a predetermined temperature causes the second bond adhesive to bond the permanent regions permanently to form a completed LOM object. The method may comprise heating the object media layers to a temperature above the melting point of a wax used in the first tack adhesive. The method may comprise heating the object media layers to a temperature above 80° C. and retaining the temperature at this level for a period that ensures sufficient time for the first tack adhesive to migrate away.

Heating of the first tack adhesive may cause capillary flow of the first tack adhesive leading to debonding of the temporary bond regions of the object media layers. The object media layers may comprise sheets of paper.

BRIEF DESCRIPTION OF THE DRAWINGS

The present application will now be described with reference to the accompanying drawings in which.

DETAILED DESCRIPTION OF THE DRAWINGS

The words comprises/comprising when used in this specification are to specify the presence of stated features, integers, steps or components but does not preclude the presence or addition of one or more other features, integers, steps, components or groups thereof.

Figure 2:
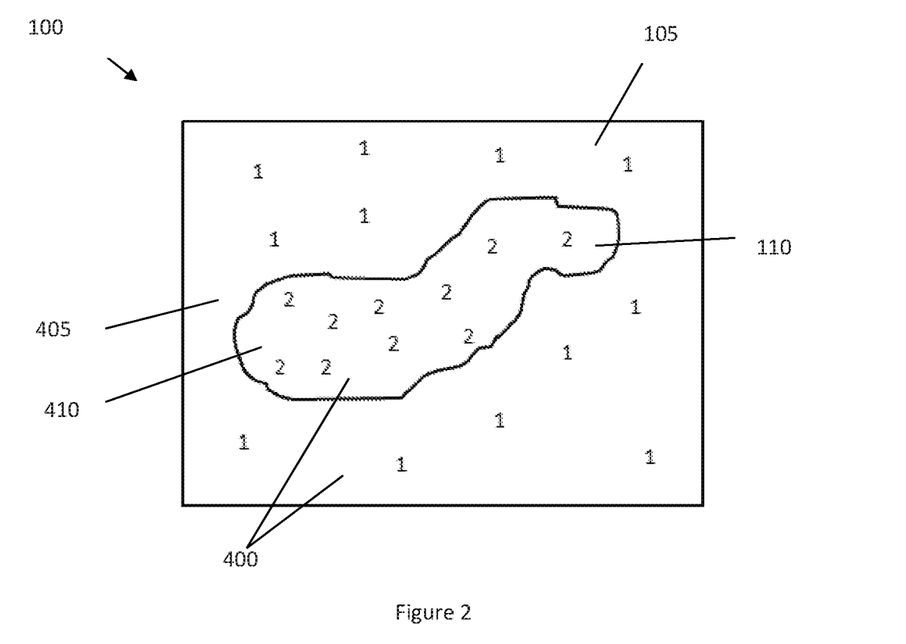
FIG. 2 is a diagram illustrating tack and bond adhesive regions in a media layer of a LOM object.
Figure 3:
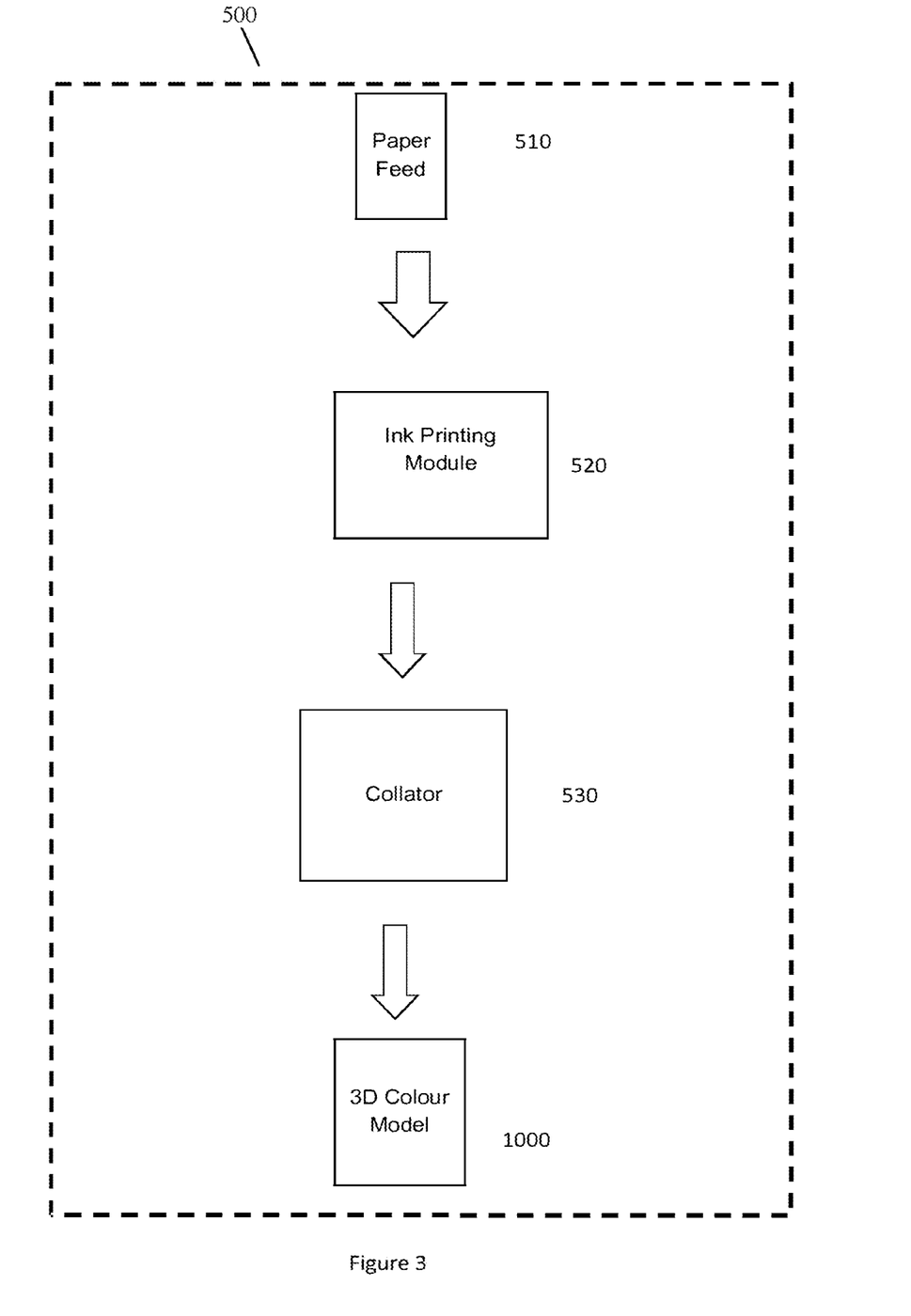
FIG. 3 is a block diagram of a Layer Object Manufacturing (LOM) system according to the present teaching.
Figure 4:
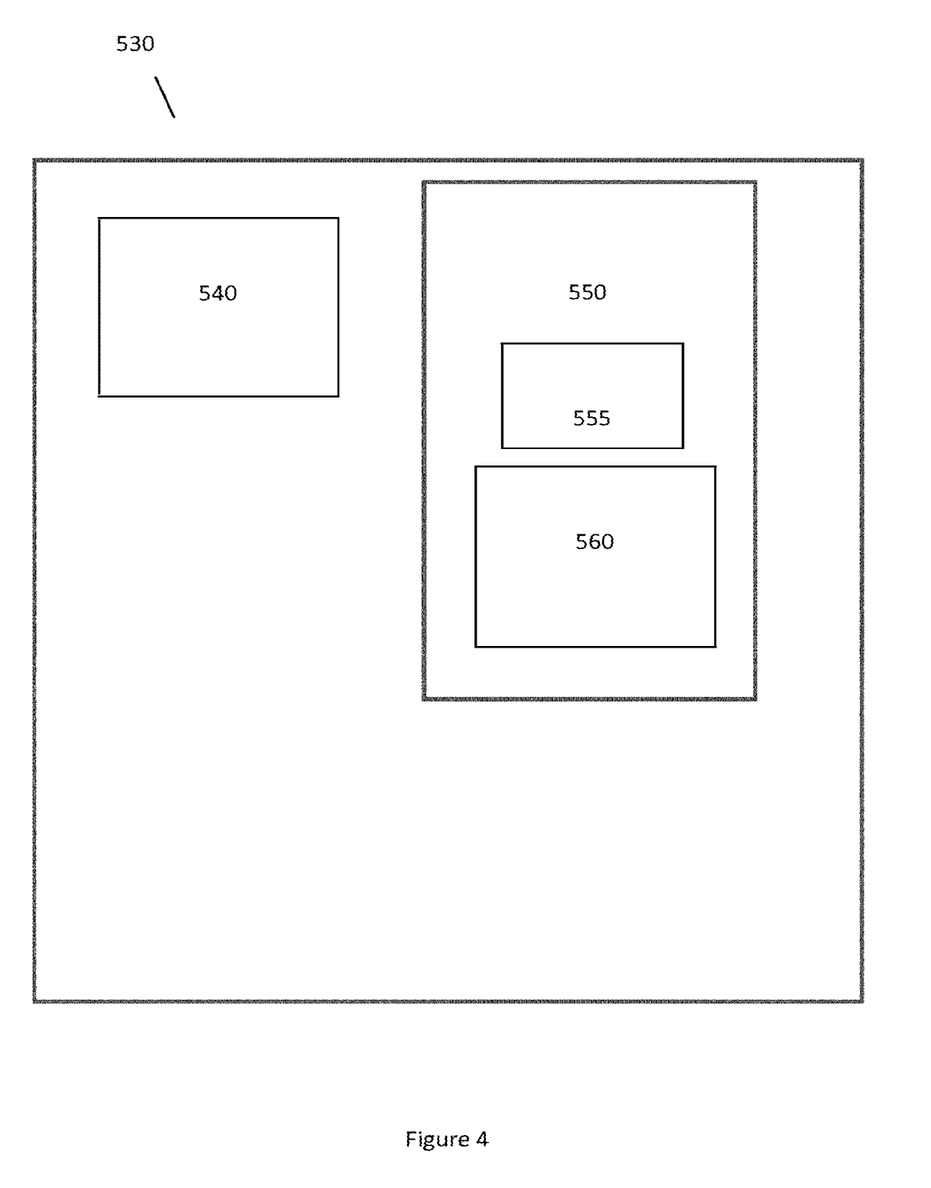
FIG. 4 is a block diagram of a collator module according to an embodiment of the present teaching.

Referring to the drawings and initially FIGS. 2 to 4 a Layered Object Manufacturing (LOM) system for forming a three-dimensional (3D) object is provided. The system comprises an adhesive dispensing device 560.

FIG. 2 is a diagram illustrating tack and bond adhesive regions in an object media layer 100 of a LOM object. Referring to FIG. 2, an object media layer 100 of an LOM object 1000 includes different regions namely temporary regions 105, being those regions which are to be removed or weeded in the process of forming the three-dimensional object 1000, and permanent regions 110 which are layer built and bonded to form the final three-dimensional object 1000.

In the present specification, two different types of adhesive 400 are provided for use in the process of forming an LOM object. A first adhesive 405 is applied to temporary regions for tacking the temporary regions 105 (regions to be weeded) and a second adhesive 410 is applied to the permanent regions 110 for bonding permanent regions 110 of a plurality of 3D object media layers.

Referring to FIGS. 2 to 4, the system and adhesive dispensing device is configured to apply adhesive to the object media layer 100, comprising applying the first adhesive 405 to temporary regions 105 of the object media layer 100 and the second adhesive 410 to permanent regions 110 of the object media layer 100.

The first adhesive 405 is provided for temporarily bonding or tacking temporary regions 105 of a plurality of object media layers 100 in a Layered Object Manufacturing (LOM) system for forming a three-dimensional (3D) object is provided. The first adhesive 405 provides a bonding of media layers 100 when applied thereto. The first adhesive 405 provides bonding in a temperature range including room temperature and operation temperature of the system device. The first adhesive 405 provides bonding at normal room or air or operating pressures. The first adhesive is a tacking adhesive 405. The weeding of temporary regions of the object is facilitated and eased by use of the temporary or tacking adhesive. The tacking adhesive is configured to provide temporary bonding. The tacking adhesive is configured to become inactive as a bonding agent and/or to release the bond, and/or to be removed, when required. The tacking adhesive is deactivatable and/or releaseable and/or removeable when it is no longer required that the temporary regions 105 be bonded together. The tacking adhesive 405 when deactivated or inactive or released or removed no longer provides bonding of temporary regions. The tacking adhesive 405 becomes inactive or is removable for the step of weeding temporary regions 105 of a build object.

In a preferred example arrangement according to an embodiment of the present specification, the tacking adhesive 405 is configured to be deactivated or removed upon application of head above a predetermined temperature. The tacking adhesive 405 is configured to melt and flow out of an interface between the temporary regions 105 of the media layers 100 upon the application of heat to the plurality of object media layers 100 to which adhesive 405 has been applied. The tacking adhesive 405 is configured to melt and flow out of an adhesive interface between temporary regions 105 of the object media layers when the plurality of adhesive printed object media layers are heated above a predetermined temperature.

It will be appreciated that while the application of heat or a predetermined minimum is used to deactivate or remove the tack adhesive other alternative arrangements may be used. For example the adhesive 405 may be configured to be deactivated on the application of a low temperature or on application of a predetermined pressure. Alternatively another suitable deactivation method may be provided.

According to the present specification a second adhesive is provided for permanently bonding bond regions 110 of the plurality of object media layers 100. The second adhesive is a bond or permanent bond adhesive. The bond regions 110 which are bonded together using the second permanent bond adhesive remain bonded when heat above a predetermined temperature is applied. In one arrangement the second permanent bond adhesive is not affected by the application of heat to release the bond of the tacking adhesive. In another arrangement the bond of the second adhesive may be increased on application of heat. The bond may become stronger upon application of heat above a predetermined temperature.

Referring to FIG. 3, the system comprises a layer bonding module 550 for bonding the plurality of individual object media layers to form a 3D object in a LOM system. Each object media layer comprises a temporary region 105 to which the first tacking adhesive 405 is applied and a permanent region 110 to which the second bond adhesive 410 is applied.

Referring to FIG. 4, the layer bonding module 550 may comprise a heating element 555 for heating the plurality of adhesive printed object media layers 100.

Referring to FIGS. 2, 3 and 4, the operation of a Layered Object Manufacturing (LOM) system according to the present specification to assemble a plurality of individual printed media layers 100 to form a three-dimensional (3D) object is described. The system comprises a collator configured to assemble the plurality of the individual printed media layers, the collator comprising the adhesive dispensing device and the bonding module. The LOM system may further comprise a printing module such as an ink printer for printing the plurality of object media layers 100 before collation. FIG. 3 is a block diagram of a Layer Object Manufacturing (LOM) system 500 according to an embodiment of the present teaching.

In FIG. 3, media such as paper may be fed into a printing module 520 via a paper feed mechanism 510. The media may be printed with ink or the like in the printing module 520. The plurality of object media layers 100 are then profiled and bonded in a collator module 530 to produce a completed colour 3D object 1000.

FIG. 4 is a block diagram of the collator module 530 according to an embodiment of the present teaching. Referring to FIG. 4, the collator module 530 may comprise a separate profiling module 540 and a layer bonding module 550 respectively. The layer bonding module 550 may comprise an adhesive dispensing device 560 according to the present teaching and a heating element 555 for heating the plurality of adhesive printed object media layers 100. The adhesive dispensing device 560 may be an inkjet dispensing device.

Within the context of the present teaching, the individual media layers 100 may be considered distinct physical elements or entities. In this way they may be individually picked and placed or otherwise transported within the system. The LOM system may 500 comprise the printing module 510 configured to print a plurality of media layers 100, and the collator module 530 configured to assemble the plurality of the individual media layers 100 to form the 3D object 1000. Each of the individual media layers 100 may be individually or independently printed. The collator module 530 may comprise profiling and layer bonding modules 540 and 550 for cutting the individual 3D object media layers and bonding the individual layers together to form the finished 3D object 1000.

The printing module 520 may be provided in a separate processing module from the collator 530 or may be integral.

The collator module 530 may comprise a layer bonding module 550 configured to bond individual ones of the plurality of media layers 100. The layer bonding module 550 may be configured to use an adhesive 400 to bond the layers 100 together. The adhesive is dispensed using the adhesive dispensing device 560 according to the present teaching. The collator module 530 may also comprise a profiling module 540 configured to effect a profiling of individual ones of the plurality of media layers 100 to effect a desired 3D shape within the 3D object 1000. The profiling module 540 and the layer bonding module 550 may be integrated in a single profiling and layer bonding module within the collator module 530.

The printing module 520 may be an office printer that has large capacity input and output trays and comes with duplex units as standard. The printing module 520 may also be integrated with the collator module 530, such that the printing process immediately precedes the profiling and bonding processes. The printing module 520 may be a colour printing module. The printing module 520 may also be the same printer as the adhesive dispensing device 560, whereby colour inks and adhesive inks are each dispensed using their own dedicated printing channel and ink supply. However it is preferable that the printing module and the adhesive dispensing devices are separate printing devices.

The present specification provides a system and method for bonding and profiling, and particularly a bonding method for bonding individual ones of the plurality of object media layers 100 to one another. As mentioned above, in LOM rapid prototyping, there are initially two regions of the LOM object. That is, the LOM object comprises a permanent bond region 110 where the layers are bonded together to constitute the final 3D object 1000, and a temporary tack region 105. The tack regions 105 are subsequently "weeded" to separate and remove them from the final 3D object 1000. The present teaching provides for different adhesives to be applied to the temporary region 105 and the permanent region 110 of each of the object media layers 100.

The two different types of adhesive 400 comprise the tack adhesive 405 and the bond-adhesive 410. The purpose of the tack adhesive 405 is to temporarily bond or tack the layers 100 together during lamination and cut processes such that the action of the cutting process does not disturb the layer being cut. i.e., prevent the cut layer from lifting or tearing during cutting. Once the LOM process is complete, the tack adhesive 405 may be removed by subsequent processing which will be explained later. The temporary regions 105 are indicated in FIG. 3 with the "1" character.

The purpose of the bond adhesive 410 is to permanently bond the object media layers 100 to one another. The bond is preferably sufficiently strong such that the layers 100 do not separate from one another during the weeding process, and in subsequent handling of the 3D object 1000. The permanent regions 110 are indicated in FIG. 2 with the "2" character.

The system and method of the present specification provides that both the temporary tack adhesive 405 and permanent bond adhesive 410 may be co-printed simultaneously using the adhesive dispensing device 560 according to the present teaching.

The adhesive dispensing device 560 may comprise control means to enable the discriminatory application of specific volumes of adhesive 405, 410 at specific locations on the object media layer 100. This enables the controlled dispensing of adhesive to specific locations which advantageously allows for reduced volumes of adhesive to be used and also ensures that the adhesive is applied specifically at the locations where the adhesive is required.

In this regard, the adhesive dispensing device 560 may comprise an adhesive printer configured to print the tack adhesive 405 and the bond adhesive 410 at specific locations 105, 110 on the object media layer 100. The adhesive dispensing device 560 may be configured to apply or print specific controlled volumes of the adhesives to the target locations 105 and 110. The volumes may be adjustable.

Figure 5:
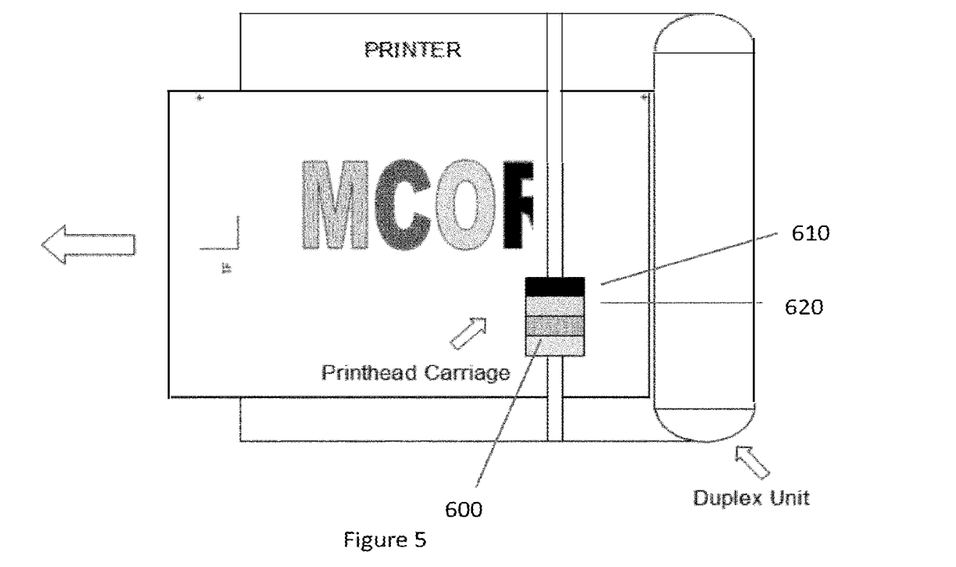
FIG. 5 illustrates a typical print head carriage that is configured to scan across the width of an object media layer when printing ink or adhesive.
Figure 6:
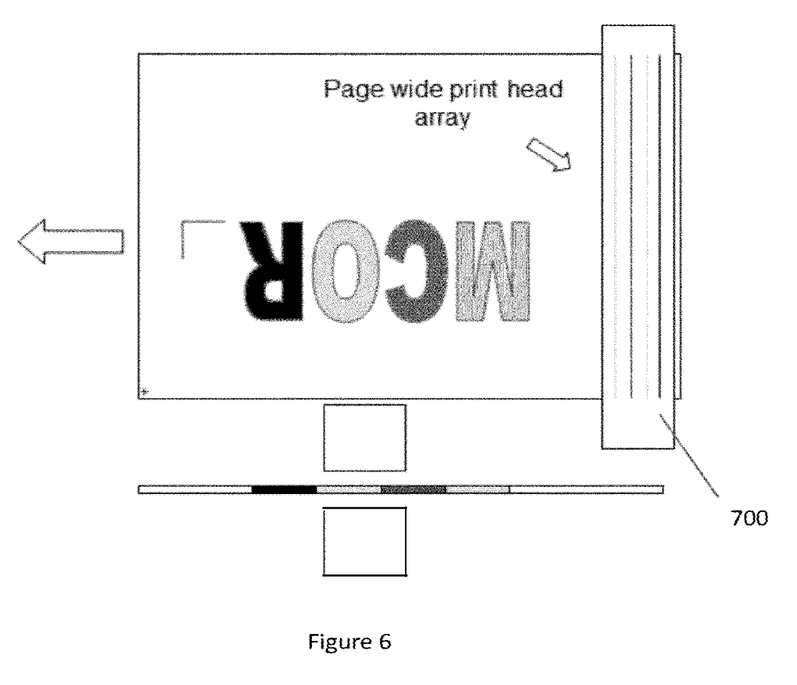
FIG. 6 illustrates a page-wide array print head.

As mentioned above, the present teaching provides an adhesive dispensing device for use in layered object manufacturing (LOM) systems for rapid prototyping. Referring to FIG. 4, the adhesive dispensing device 560 according to the present teaching may be included in the collator module 530. The adhesive dispensing device 560 provides for the application of adhesive to a 3D object media layer 100. The device 560 is configured to apply a first adhesive 405 for tacking temporary regions 105 of the 3D object media layer 100 and a second adhesive 410 for bonding permanent regions 110 of the 3D object media layer 100. The adhesive dispensing device 560 may comprise one or more inkjet printheads. Preferably the device comprises a single printhead provided with the ability of printing two or more fluids simultaneously. The printhead does not make contact with the object media layer 100 and may be scanned back and forth at speed to rapidly deposit one or more layers of adhesive onto the substrate. The printhead may comprise a print head carriage that is configured to scan across the width of an object media layer 100 when dispensing adhesive. Alternatively, the printhead may comprise a page-wide array print head. FIG. 5 illustrates a typical print head carriage 600 that is configured to scan across the width of an object media layer 100 when printing ink or adhesive. Referring to FIG. 5, the print head carriage 600 may be configured to dispense a first tack adhesive 605 and a second bond adhesive 610. FIG. 6 illustrates a page-wide array print head 700 that may also be configured to dispense a first tack adhesive 605 and a second bond adhesive 610.

The adhesives 405, 410 used for both the tacking and bonding may be preferably formulated to be suitable for inkjet printing. The adhesives may be configured such that the viscosity of the adhesive is generally less than 50 mPa·s, and preferably in the range of 1-10 mPa·s. The surface tension of the adhesives is preferably greater than 34 N·m$^{-1}$ so that it is rendered less liable to wick through a porous surface of the object media layer and result in less of the adhesive being available at the surface for bonding. The preferred range of surface tension is in the range 34-50 mN·m$^{-1}$.

It will be appreciated that different formulations of a tacking adhesive according to the present specification may be provided.

The tack adhesive 405 has been formulated taking account of issues and features including the following:

- The adhesive may be formulated so that when it is heated above its melting point it becomes a liquid
- The adhesive may have a sufficiently low viscosity to allow it to be inkjet printed
- The adhesive may comprise wax
- The wax may be selected according to the desired post-processing temperature
- The adhesive may comprise a microemulsion
- The adhesive may comprise a microemulsion of wax particles in deionised water
- The adhesive may further comprise stearic acid
- The tack adhesive may further comprise glycol
- The adhesive may a relatively high surface tension when deposited onto cellulose-based paper
- The adhesive is suitable for printing
- The adhesive is suitable for printing using an inkjet printhead.

According to preferred exemplary arrangement of embodiments of the present specification different types of tack adhesive may be used including the following:

a) 100% Solid Wax Formulation

The tack adhesive may comprise a single solid wax such as beeswax. The wax may be formulated so that when it is heated above its melting point it becomes a liquid and has a sufficiently low viscosity to allow it to be inkjet printed.

b) Microemulsion of Wax Particles in Water

The tack adhesive may alternatively comprise a microemulsion of wax particles in deionised water. This formulation may be simpler to implement as it does not require elevated ink temperatures. In order to form the microemulsion, 100 g of deionised water may be heated to 90° C. and 60 grams of solid wax flakes may be added thereto. The mixture may then be agitated using a high-speed shear mixing blade at around 10,000 rpm for 60 seconds, and then the mixture is allowed to cool. The wax quantity may be varied such that it is in the range of 10% wax to 90% water up to 60% wax to 40% water. Solid wax may be substituted for wax flakes, as can wax granules be substituted for wax flakes. The shear speed may be adjusted from 3000 rpm up to 15,000 rpm and the mixing time may be adjusted from 10 seconds up to 300 seconds. The wax may be selected according to the desired post-processing temperature. In this regard, the wax may comprise paraffin wax, beeswax, or Carnauba wax. A table showing the melting points of these waxes is provided as follows:

| Type | Melting Point (deg C.) |
| --- | --- |
| Paraffin | 46-68 |
| Beeswax | 62-64 |
| Carnouba | 82-86 |

The result is the creation of a microemulsion of wax particles in a matrix of deionised water.

The microemulsion may further comprise stearic acid. The addition of stearic acid may adjust the pH of the microemulsion to between pH 10-11, thereby stabilizing the microemulsion, and preventing creaming, agglomeration or sedimentation of the wax particles.

The tack adhesive may further comprise glycol. The effect of the addition of glycol is that a printhead used for dispensing the adhesive can be left uncapped for a longer period of time. Glycol also improves the performance of the tack adhesive in a printhead. That is, the adhesive may remain in the printhead nozzles for a longer period without drying out.

Figure 8:
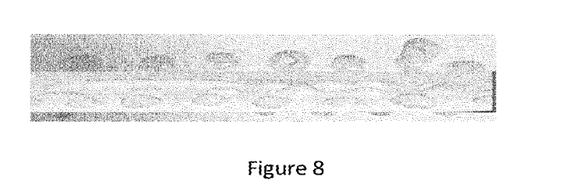
FIG. 8 is a photographic image of a wax microemulsion in water printed onto paper.

In experiments conducted, a Carnauba wax emulsion was measured for inkjet printable properties. The viscosity of the emulsion was 4.76 mPa·s and the surface tension was 35.42 mN·m$^{-1}$. The resultant wax microemulsion adhesive had a relatively high surface tension when deposited onto cellulose-based paper and produced a contact angle of around 70° C. FIG. 8 is a photographic image of a wax microemulsion in water printed onto an object media layer in the form of paper.

As mentioned above, the wax microemulsion may be printed using a conventional inkjet printer that is designed with two ink fluid pathways by scanning the printhead across the paper media. The wax microemulsion may be deposited onto the object media layer where it is retained as sphere-like drops. Water will immediately begin to evaporate from the micro emulsion drops and the wax particles will begin to coalesce and form small disks approximately 50 microns in diameter and 20 microns high (based on an initial drop volume of 28 picolitres).

The bond adhesive formulation may be obtained by diluting an ethylene vinyl acetate (EVA) co-polymer glue emulsion and with deionised water. The ratio may be 1 part glue to 9 parts of water. The mixture may then be agitated thoroughly. This results in a microemulsion of EVA particles in water, and approximately 5% EVA solids in water. The viscosity of this solution was measured to be 1.66 mPa·s and the surface tension thereof was measured to be 53.65 mN·m$^{-1}$. Accordingly, the resultant microemulsion had a high surface tension and produced a wetting angle of approximately 80° when printed onto cellulose-based paper. A range of such wax microemulsions in water has been prepared in the laboratory with surface tension values ranging from 34.5 mN·m$^{-1}$ up to 72 mN·m$^{-1}$. For high surface tension values it may be necessary to reduce the fluid's retaining back-pressure in order to assist in the jetting of the fluid.

Figure 9:
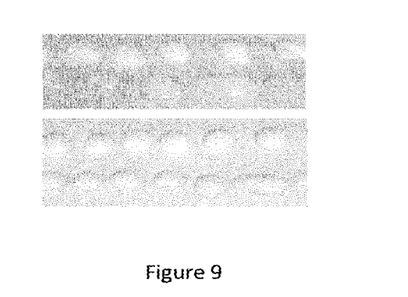
FIG. 9 is a photographic image of an ethylene vinyl acetate (EVA) microemulsion printed onto paper.

Various wetting angles were produced ranging from 65° C. up to 90° C. FIG. 9 is a photographic image of an EVA microemulsion printed onto paper.

Figure 7:
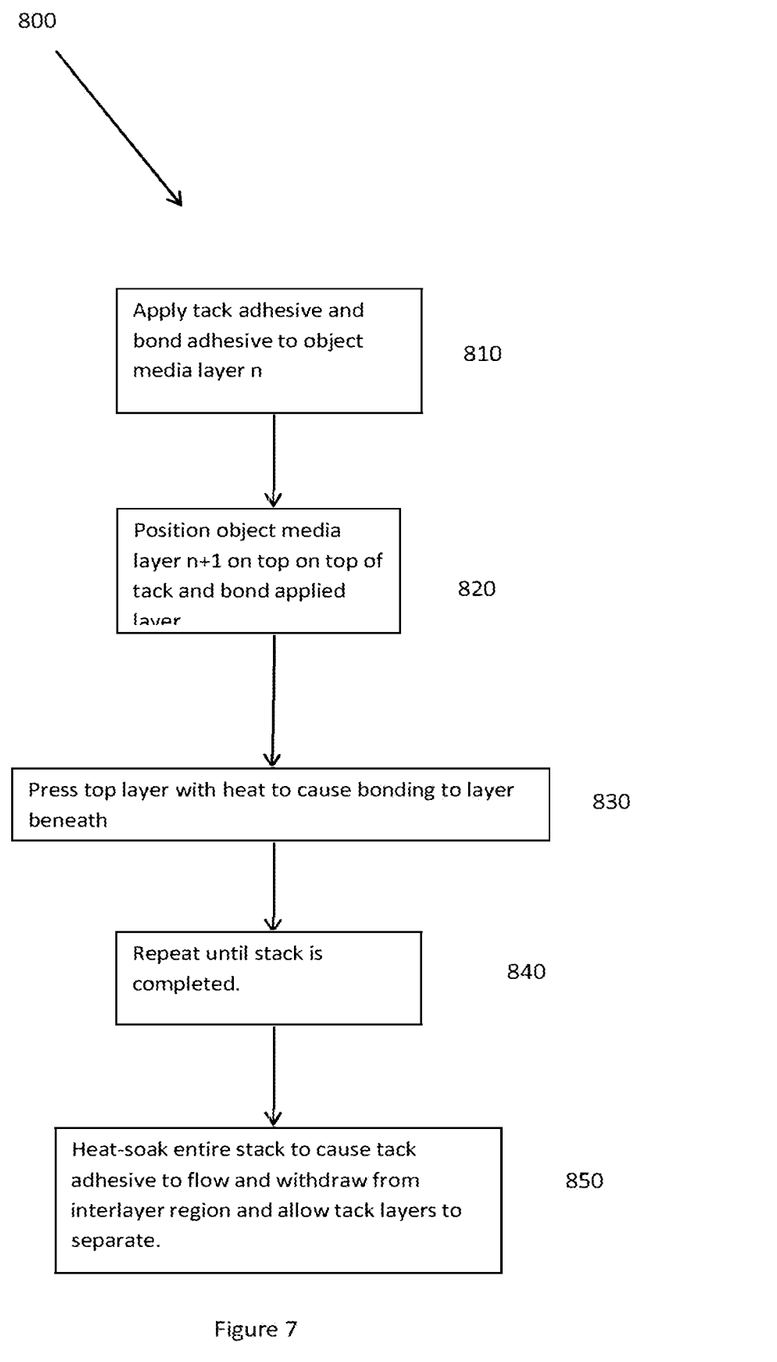
FIG. 7 is a flowchart illustrating a process of bonding a plurality of individual object media layers to form a three-dimensional (3D) object in a Layered Object Manufacturing (LOM) system, according to an embodiment of the present teaching.
Figure 10:
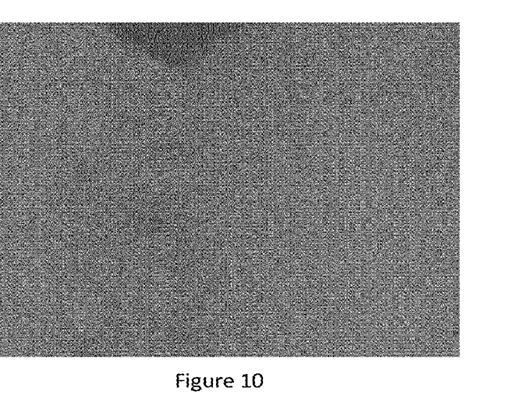
FIG. 10 is a photographic image of an example of a bonded region paper failure after attempting to separate two layers after bonding and thermally laminating.

FIG. 7 is a flowchart illustrating a method or process 800 of bonding a plurality of individual object media layers to form a three-dimensional (3D) object in a Layered Object Manufacturing (LOM) system, according to an embodiment of the present teaching. The plurality of object media layers 100, which may have been previously printed with ink or the like, each comprise a tack or temporary region 105 and a bond region 110 as described previously. Referring to FIG. 7, the tack adhesive 405 and the bond adhesive 410 are applied 810 to the temporary region 105 and permanent region 110 of an object media layer n, respectively. The adhesives may be applied using the inkjet printing adhesive dispensing device 560 described previously. The object media layers 100 are positioned on top of one another 820. The object media layers 100 may be positioned on top of one another as adhesive is applied to each layer. In this way, object media layers 100 may be positioned on top of object media layers 100 to which adhesive has previously been applied. For example, an object media layer n+1 may be positioned on top on top of a tack and bond applied layer, as illustrated in step 820. The partially completed LOM build stack is then pressed with a heated plate in step 830 to cause the most recently applied layer to make intimate contact with the lower layer. The heating causes partial melting of the tack adhesive such that it flows and is retained as an interlayer between the upper and lower media layers. Retaining the glued layers in contact with a surface heated to 80° C. for two seconds may cause the wax in the tack adhesive 605 to partially melt and flow. On removing the layers from the heat source the wax may re-solidify to form a tack between the two layers. The bond adhesive layers create a much stronger bond force. Experiments have shown that if the bond adhesive layers are pulled apart, paper fibres in the bond regions may tear. i.e., the paper itself may fail before the glue bond fails. FIG. 10 is a photographic image of a bonded region paper failure after attempting to separate two object media layers after bonding and thermally laminating. On completion of the build sequence after step 840, the entire LOM stack is placed in a heating oven at a temperature between 5° C. and 30° C. above the melting point of the tack adhesive. Referring to step 850, the LOM stack is allowed to thermally soak in the heating oven such that the heat penetrates the LOM stack entirely. This time period is dependent on a number of variables, including the amount of tack adhesive applied, the water content of the adhesives used, the height of the LOM stack, and the heating temperature. However, in general the heating time may be a short as ten minutes for small stack objects and up to one hour for large stack objects.

The extended heating time causes the tack adhesive to melt and flow substantially away from the tack region and migrate away from the bonded object by capillary action. The tack layer bonding forces are thus released and the tack regions media are thus separated easily causing the object to be more-or-less self-weeding. In this way, the temporary regions 105 of the object media layers 100 are not adhered together, which facilitates the separation or weeding process performed subsequently. Finally, the completed LOM object comprising the bonded permanent regions 110 is separated 840 from the tacked/released temporary regions 105.

By retaining the LOM layer stack at an temperature of about 90° C. such that the inner core of the LOM stack and the outer environment achieve a uniform temperature, the permanent bond adhesive regions 110 tend to strengthen with further loss of water at the elevated temperature.

On the other hand, the first tack adhesive 405 melts to become a low viscosity liquid, and migrates away from the printed regions by capillary action. The first tack adhesive 405 may generally move in a direction away from the permanent bond region 110 already occupied by the permanent bond adhesive 410.

The result is that the layers 100 in the tack regions 105 lose all structural integrity and tend to auto-separate, or to self-weed and separate from the permanently bonded object 1000.

A method of bonding a plurality of individual object media layers to form a three-dimensional (3D) object in a Layered Object Manufacturing (LOM) system is provided, the method comprising:

applying a first tack adhesive to the temporary regions of each of a plurality of object media layers;

applying a second bond adhesive to the permanent regions of each of the plurality of object media layers;

positioning the object media layers on top of each other to form the object;

heating the object media layers above a predetermined temperature causing the first adhesive to melt, and on cooling re-solidify to form a temporary bond region;

heating the object media layers above the melting point of the tack adhesive, causing the tack adhesive to migrate away from the interlayer bonding region by capillary action; and separating the temporary regions from the LOM object.

Heating the object media layers above a predetermined temperature causes the second bond adhesive to bond the permanent regions permanently to form a completed LOM object.

The heat is applied to heat the object media layers to a temperature above the melting point of a wax used in the first adhesive. In a preferred arrangement according to the present specification the heating step includes heating the object media layers to a temperature above 80° C. Heating of the first adhesive causes capillary flow of the first adhesive and causing a debonding of the temporary regions of the object media layers. In a preferred arrangement according to an embodiment of the present specification, the first adhesive is a temporary adhesive and the object media layers comprise sheets of paper and heating causes the capillary flow of the first temporary adhesive causing a debonding of the paper sheets.

The terms media, object media layers and layers have been used interchangeably. The terms refer to the substrate that is being used in the 3D fabrication process. In a preferred arrangement of the present application this is paper or cellulose paper. However, it will be appreciated that other media types could be employed, and may include, polymer film, metal foils, ceramic powder impregnated paper sheets, metal powder impregnated sheets, polymer powder impregnated sheets, water soluble papers, substrates made from waxes etc.

The present teaching overcomes the problems of removing temporary support materials from a permanently bonded LOM object. This is achieved by using a temporary adhesive which is configured to release the temporary regions or temporary support layers of a build object when the entire LOM layer stack is heated above the melting point of the tack adhesive. This causes the tack adhesive to flow, and leave the temporary support layer interface. The present teaching advantageously eliminates the need to use force to tear away the temporary support structures to reveal the LOM object. Further, the bonding module of the present teaching is advantageously configured to speed up the process required to separate the LOM object from its support material. The present teaching also reduces the likelihood of damaging the LOM object during weeding, or inadvertently removing LOM object material.

While the present invention has been described with reference to some exemplary arrangements it will be understood that it is not intended to limit the teaching of the present invention to such arrangements as modifications can be made without departing from the spirit and scope of the present invention. In this way it will be understood that the invention is to be limited only insofar as is deemed necessary in the light of the appended claims.

The invention claimed is:

1. A method of bonding a plurality of individual object media layers to form a three-dimensional (3D) object in a Layered Object Manufacturing (LOM) system, each object media layer comprising temporary regions and permanent regions, the method comprising:
applying a first tack adhesive to the temporary regions of each of a plurality of object media layers;
applying a second bond adhesive to the permanent regions of each of the plurality of object media layers;
positioning the object media layers on top of each other to form an LOM object;
heating the object media layers above a predetermined temperature causing the first tack adhesive to melt, and on cooling re-solidify to form temporary bond regions;
heating the object media layers above the melting point of the first tack adhesive, causing the first tack adhesive to migrate away from the temporary bond regions by capillary action; and
separating the temporary regions from the LOM object.

2. The method of claim 1, wherein heating the object media layers above a predetermined temperature causes the second bond adhesive to bond the permanent regions permanently to form a completed LOM object.

3. The method of claim 1, comprising heating the object media layers to a temperature above the melting point of a wax used in the first tack adhesive.

4. The method of claim 1, comprising heating the object media layers to a temperature above 80° C. and retaining the temperature at this level for a period that ensures sufficient time for the first tack adhesive to migrate away.

5. The method of claim 1, wherein heating of the first tack adhesive causes capillary flow of the first tack adhesive leading to debonding of the temporary bond regions of the object media layers.

6. The method of claim 1, wherein the object media layers comprise sheets of paper.

* * * * *